J. W. CHAPMAN.
TEA OR COFFEE POT.
APPLICATION FILED DEC. 23, 1909.
973,758.
Patented Oct. 25, 1910.
2 SHEETS—SHEET 2.
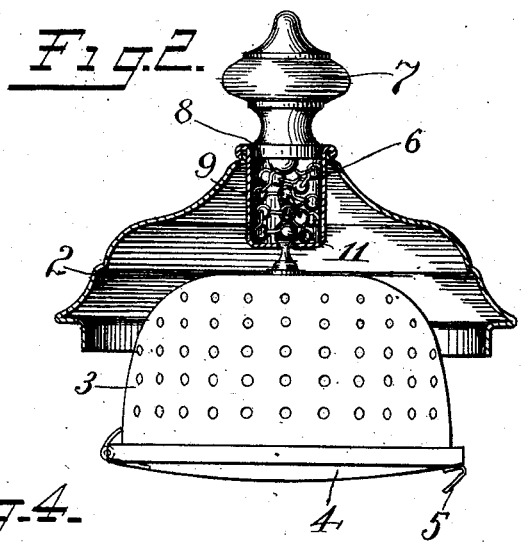
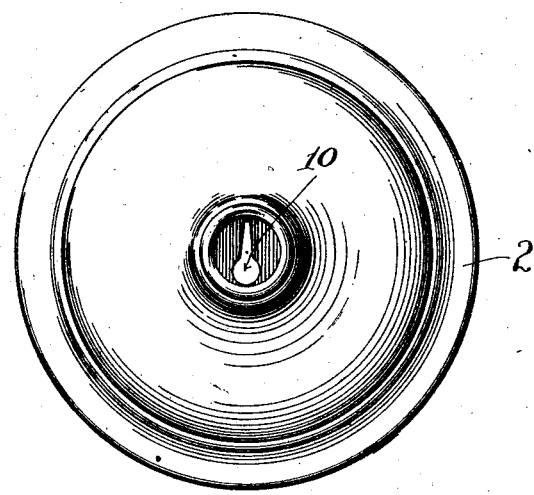
Witnesses:
Fred M. Dammafelser
Chas M Peard
Inventor
JAMES W. CHAPMAN
By his Attorneys
Bartlett, Brownell & Mitchell
THE NORRIS PETERS CO., WASHINGTON, D. C.

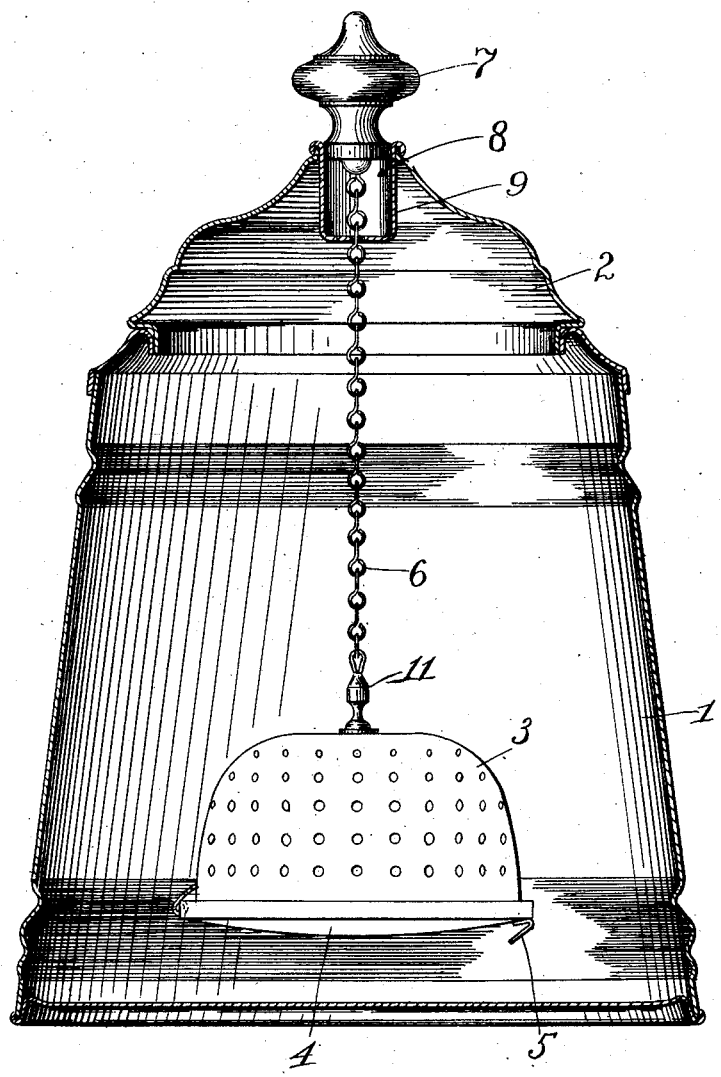

UNITED STATES PATENT OFFICE.

JAMES W. CHAPMAN, OF MERIDEN, CONNECTICUT, ASSIGNOR TO MANNING, BOWMAN & COMPANY, OF MERIDEN, CONNECTICUT, A CORPORATION OF CONNECTICUT.

TEA OR COFFEE POT.

973,758.  Specification of Letters Patent.  Patented Oct. 25, 1910.

Application filed December 23, 1909. Serial No. 534,584.

*To all whom it may concern:*

Be it known that I, JAMES W. CHAPMAN, a citizen of the United States, residing at Meriden, county of New Haven, State of Connecticut, have invented certain new and useful Improvements in Tea or Coffee Pots, of which the following is a full, clear, and exact description.

My invention relates to improvements in tea or coffee pots and is particularly concerned with a device of this character having means whereby the tea or coffee from which the infusion is to be made may be elevated or lifted out of the liquid in the pot in order to vary the strength of the infusion as desired, without removing the tea or coffee from the pot.

The invention also contemplates improved means for holding the receptacle containing the tea or coffee, suspended in such elevated position from the pot cover, and for locking the same to said cover to prevent the receptacle from accidentally dropping back into the pot, and to facilitate removal and replenishing of the receptacle.

For a clear understanding of the invention, a preferred form thereof is illustrated in the accompanying drawings, in which—

Figure 1 is a vertical section of a tea or coffee pot illustrating the invention in conjunction therewith; Fig. 2 is a view of the cover of the pot detached showing the tea or coffee receptacle in elevated position and locked to the cover; Fig. 3 is a plan view of the cover of the pot, showing the slot for holding the receptacle, and Fig. 4 is a fragmentary view of a modified form of chain or connection by which the tea or coffee receptacle is manipulated.

In the embodiment of the invention herein selected for illustration, 1 indicates the body of the pot, which may be of any desired construction, and 2 indicates the cover, which may be entirely removed from the pot for the purpose of replenishing the supply of tea or coffee in the receptacle attached thereto. The tea or coffee receptacle consists preferably of a basket 3 which may be struck-up from perforated sheet metal, if desired, or made of other foraminous material and has hinged thereto a cover 4 provided with a latch 5 by which it may be held in closed position. This receptacle is suspended preferably by a chain 6 from the knob or handle 7 of the cover which knob is removably fitted within an opening 8 of the cover. Extending within the cover is a cup member 9 in the base of which is formed a substantially key-hole shaped slot 10 (Fig. 3) through which the chain 6 passes.

In order to hold the receptacle 3 in elevated position and free of the liquid in the pot, said receptacle is provided with a shouldered stud or pin 11, the shouldered portion of which is of a diameter to pass freely through the larger part of the key-hole slot 10 whereupon by a slight lateral movement, the reduced portion of said stud 11 may be passed into the narrower part of the key-hole slot, thus holding the receptacle or basket in elevated position, as indicated in Fig. 2.

As will be seen from an inspection of Fig. 3, the narrower portion of the key-hole slot is tapered, whereby, if desired the basket may be held in any intermediate position by engagement of any link of the chain with such tapered portion, so that, if desired, the basket or receptacle may be but partially removed from the liquid in the pot, in order merely to retard the rate of infusion.

As shown in the modified form of chain, Fig. 4, the latter, if desired, may be provided at intervals with small beads or balls 12 for engagement with the reduced portion of the key-hole slot.

To manipulate the basket, it is only necessary to remove the knob from the cover and draw up the chain through the larger portion of the key-hole slot, whereupon by engaging the stud or pin with said slot as described the basket will be held in lifted position, entirely free of the liquid in the pot. The chain may then be nested in the cup member 9 around the stud or pin 11 and the knob replaced on the cover. By this arrangement, the nested chain locks the pin against accidental release from the key-hole slot, thus holding the receptacle securely in place when the pot is tipped in pouring, or otherwise moved, and facilitating removal of the cover and receptacle to fill or clean the latter. By the above construction it will be seen also that the connections for lifting the basket or receptacle are contained entirely within the pot and the exterior appearance of the pot is entirely unaffected thereby, whether the receptacle is in its lower or elevated position. Furthermore the simplicity of the construction renders it economical to manufacture and easy to clean.

While I have herein shown a preferred embodiment of my invention, it is to be understood that the same may be varied in detail and relative arrangement of parts within the scope of the appended claims.

What I claim is:

1. A tea or coffee pot comprising in combination, a pot, a cover therefor having a knob removable therefrom, a foraminous receptacle suspended within the pot from said knob by a flexible connector whereby said receptacle may be raised by the removal of said knob, and means within and carried by said cover adapted to engage said connector to hold said receptacle in elevated position.

2. A tea or coffee pot comprising a pot, a cover therefor having a knob removable therefrom, a foraminous receptacle suspended within the pot from said knob by a connecting member, a member carried by and extending within the cover, slotted to permit the passage of said connecting member, and means carried by said receptacle to engage said slot to hold the receptacle in elevated position.

3. A tea or coffee pot comprising in combination, a pot, a cover therefor having a knob removable therefrom, a foraminous receptacle suspended from said knob whereby said receptacle may be raised by the removal of said knob, a tubular member projecting inwardly from said cover and having a key-hole slot in the bottom thereof, and a shouldered stud or pin on said receptacle adapted to pass through the larger portion of said slot and to be engaged by the smaller portion thereof to hold said receptacle in elevated position within said pot with said stud entirely concealed within said tubular member.

4. A tea or coffee pot comprising in combination a pot, a cover therefor having a removable knob, a foraminous receptacle suspended within the pot from said knob by a flexible connector and a cup-like member extending inwardly from said cover having means to engage said connector to hold said receptacle in elevated position, said connector being adapted to be nested within said cup-like member to prevent disengagement of said connector from said member.

5. A tea or coffee pot comprising in combination a pot, a cover therefor having a removable knob, a foraminous receptacle suspended from said knob by a flexible connector, a cup-like member projecting inwardly from said cover and having a key-hole slot therein, a shouldered stud or pin on said receptacle adapted to pass through the larger portion of said slot and to be engaged by the smaller portion thereof, to hold said receptacle in elevated position, said cup-like member being adapted to have said connector nested therein and around said stud to prevent disengagement of the latter from said slot.

6. A tea or coffee pot comprising in combination a pot, a cover therefor having a removable knob, a foraminous receptacle suspended from said knob by a chain, a member projecting inwardly from said cover and having a key-hole slot therein, a shouldered stud or pin on said receptacle adapted to pass through the larger portion of said slot and to be engaged by the smaller portion thereof, to hold the receptacle in the elevated position, said member being adapted to contain said chain nested around said stud to prevent accidental disengagement of the stud from said member.

7. A tea or coffee pot comprising in combination a pot, a cover therefor having a removable knob, a foraminous receptacle suspended from said knob by a flexible connector, a cup-like member projecting inwardly from said cover and having a key-hole slot therein, a shouldered stud or pin on said receptacle adapted to pass through the larger portion of said slot and to be engaged by the smaller portion thereof to hold the receptacle in elevated position, said cup-like member being adapted to have said chain nested therein whereby the knob may be replaced upon the cover with the chain concealed when the receptacle is in said elevated position.

JAMES W. CHAPMAN.

Witnesses:
A. L. STETSON,
E. J. POOLEG.